S. KUZDZIAL.
STEERING GEAR.
APPLICATION FILED MAY 22, 1915.
1,157,231.
Patented Oct. 19, 1915.
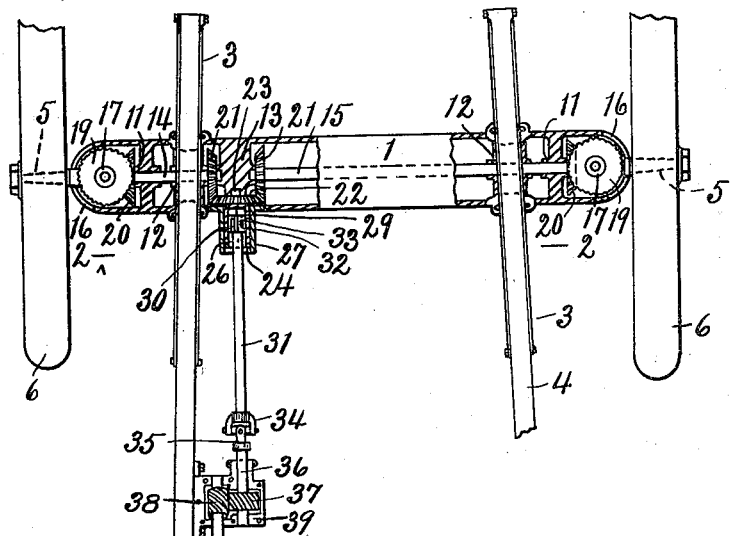
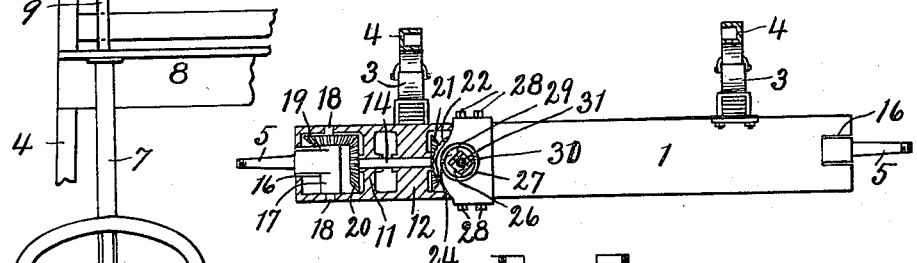
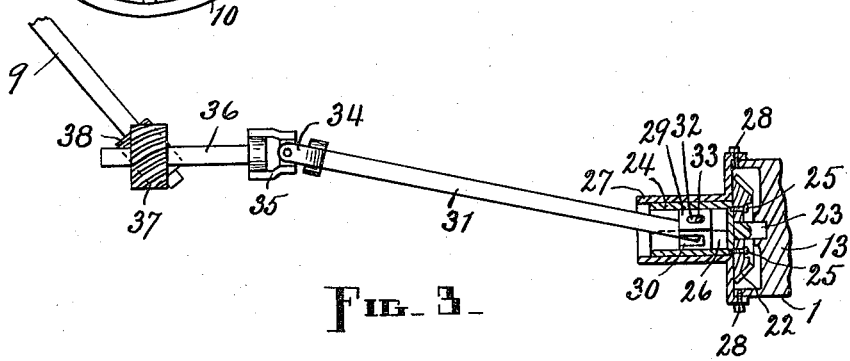
WITNESS
A. C. Fairbanks
INVENTOR.
Szczepan Kuzdzial,
BY
Frank A. Cutter,
ATTORNEY.

UNITED STATES PATENT OFFICE.

SZCZEPAN KUZDZIAL, OF HOLYOKE, MASSACHUSETTS.

STEERING-GEAR.

1,157,231.  Specification of Letters Patent.  Patented Oct. 19, 1915.

Application filed May 22, 1915. Serial No. 29,784.

*To all whom it may concern:*

Be it known that I, SZCZEPAN KUZDZIAL, a subject of the Emperor of Austria-Hungary, and a resident of Holyoke, in the county of Hampden and State of Massachusetts, have invented a new and useful Steering-Gear, of which the following is a specification.

My invention relates to improvements in steering gear for automobiles or other vehicles, and consists, with the stub-axles and the steering-post of the machine, of certain peculiar actuating mechanism carried by the front axle of said machine, and flexible transmission means between said steering-post and said actuating mechanism, together with such other parts and members as may be requisite or necessary in order to render the aforesaid mechanism and transmission practicable and serviceable, all as hereinafter set forth.

The primary object of my invention is to provide a strong, simple and sensitive mechanism for turning the front wheels of a vehicle equipped with this steering gear, at different angles with relation to the body of such vehicle. The strain incident to the steering operation is well distributed by this gear, so that there is little liability that the steering-wheel will be jerked from the hands of the driver of the vehicle by any sudden and excessive shock to which the steering wheels may be subjected or which they may sustain.

Other objects will appear from the detailed description hereinafter given and which is to be read in connection with the accompanying drawings forming a part hereof, wherein a practical embodiment of the invention is illustrated, and wherein like numerals of reference refer to similar parts throughout the several views.

In the drawings, Figure 1 is a top plan of the steering gear and of such parts of an automobile as are needed to support said steering gear and to afford a good understanding of the operation of the same, the major portion of the top of the front axle being broken away; Fig. 2, a transverse section taken on lines 2—2, looking in the direction of the associated arrow, in Fig. 1, and showing a portion of said axle in section, and, Fig. 3, an enlarged side elevation, with some of the parts in section, of the transmission mechanism between said axle and the steering-post.

Although I have illustrated the invention in a preferred form, so far as I am at present advised, it is to be understood that various changes in the shape, size, arrangement, and construction of some or all of the parts of said invention as herein illustrated may be made without departing from the spirit of the same.

I prefer to employ for a front axle a hollow box-like structure, such as is represented at 1, and upon this to mount in any suitable manner a pair of springs 3, which springs carry the front terminals of a pair of side beams 4. The axle 1 does not turn in steering, but has at the ends stub-axles 5—5 which do turn. Wheels 6—6 are mounted on the stub-axles 5. These are the front wheels of the vehicle and therefore the steering wheels. A steering column 7 is shown mounted on a support 8 therefor. A steering-post 9, having a steering-wheel 10, is mounted to turn in the column 7. All of the parts and members thus far mentioned, with the single exception of the axle 1, are old and well known.

The axle 1 structurally differs from other front axles in that it is hollow or recessed and has interior bearings, as represented at 11—11, 12—12, and 13, for two horizontal shafts 14 and 15. The axle 1 also has semi-circular ends in top plan, and slots 16—16 in such ends to accommodate the stub-axles 5 and permit the latter to move freely in either direction to the full extent required.

Each stub-axle 5 is provided at the inner end with an integral vertical post or spindle 17, and such post is journaled at the top and bottom in the axle 1, as represented at 18—18 in Fig. 2. Secured on each spindle 17, above the horizontal plane of its stub-axle 5, is a bevel-gear 19, and secured to the adjacent terminal of either the shaft 14 or the shaft 15, as the case may be, is a bevel-gear 20 which intermeshes with said first-mentioned bevel-gear. Secured to adjacent terminals of the shafts 14 and 15 are two bevel-gears 21. An intermediate bevel-gear 22 intermeshes with the bevel-gears 21 and so drives them with the shafts 14 and 15 in opposite directions.

The shafts 14 and 15 are of different lengths so that the bevel-gear 22 can be conveniently operated by the steering-post 9 which in the present case is on the left-hand side of the machine. If the steering-post 9 were on the right-hand side of the machine, it would be necessary to interchange or transpose the shafts 14 and 15 and rearrange the other parts accordingly, but the construction to all intents and purposes would be the same as before. Thus it is seen that the matter of position laterally of the machine is not of particular moment so far as this invention is concerned.

The bevel-gear 22 is operated from the steering-post 9 through the medium of certain connections which must be flexible in order to accommodate the same to the independent motion of the vehicle frame or body, which supports said post, relative to the axle 1, which carries said gear. Such connections are described as follows: The bevel-gear 22 is mounted on a spindle 23 which is journaled at the front end in the back side of the bearing 13, and is provided at the rear with a sleeve 24, said gear being secured in the present case to the front end of said sleeve by screws 25. The sleeve 24 has a rectangular interior, as represented at 26, and is journaled in a bearing 27 which is bolted at 28 to the axle 1 against the back side thereof. A rectangular sliding head 29 fits the rectangular interior or opening 26 in the sleeve 24, and is adapted to reciprocate therein. When the head 29 is rotated it carries with it the sleeve 24, with the spindle 23, and the bevel-gear 22. The head 29 has a slot 30, opening through the rear end, to receive the front end of a shaft 31, and said head also has a longitudinal slot 32, in each of the sides between which said first-mentioned slot is located, to receive a pin 33 that connects said head with said shaft. The head 29 is rotated by the shaft 31, through the medium of the pin 33, and the slots 30 and 32 enable said shaft and said pin to tilt to whatever extent may be required as said shaft is raised and lowered at the rear end by the motion of the vehicle frame on the springs. This same motion and the resulting tilting movement on the part of the shaft 31 cause the distance between the bevel-gear 22 and the driven end of said shaft to vary, but such variation is taken care of by the head 29 which moves back and forth in the sleeve 24. The shaft 31 is provided at the rear end with a universal coupling member 34, and said member is connected with a universal coupling member 35 at the front end of a short horizontal shaft 36. A worm-gear 37 is secured on the shaft 36, and said gear intermeshes with a worm secured on the forward end of the steering-post 9. A bearing-box, represented without its cover at 39 in Fig. 1, extends inwardly from the left-hand beam 4 to receive the forward terminal of the steering-post 9 with the worm 38, and the shaft 36 with the worm-gear 37. The universal coupling permits the shaft 31 to be turned by the steering-post 9, by means of the worm members and the shaft 36, regardless of the angular relation which said shaft 31 may occupy or assume to said shaft 36.

From the foregoing it is plainly to be seen that, when the steering-wheel 10 and steering-post 9 are turned to the left, the worm 38 actuates the worm-gear 37 and with it the shafts 36 and 31, the sliding head 29, the sleeve 24 and the bevel-gear 22 to the right, with the result that said bevel-gear actuates the left-hand bevel-gear 21, together with the shaft 14 and the bevel-gear 20 thereon, in a forward direction, and the right-hand bevel-gear 21, together with the shaft 15 and the bevel-gear 20 thereon, in a rearward direction, and so causes simultaneously the bevel-gear 19 on the left-hand spindle 17 to turn in such a manner as to swing the stub-axle 5, which projects from said spindle, rearwardly, thus turning the wheel 6 on said axle to the left, and the bevel-gear 19 on the right-hand spindle 17 to turn in such a manner as to swing the other stub-axle 5 forwardly, thus turning the right-hand wheel 6 to the left also. Similarly, when the steering-wheel 10 is turned to the right, the wheels 6 are turned in the same direction, the operations or movements described above being then reversed.

The power is so distributed, in this steering gear, that the steering operation is accomplished with ease and at the same time there is no undue strain on the hands of the operator, who holds the steering-wheel, when the front wheels of the vehicle encounter obstacles that tend to divert them from their course.

What I claim as my invention, and desire to secure by Letters Patent, is—

1. Steering gear comprising a hollow axle provided with interior bearings, stub-axles having spindles journaled in said axle, gears secured on said spindles, independent shafts journaled in said bearings, gears secured on said shafts, at their outer ends, to intermesh with said spindle gears, gears secured on the adjacent ends of said shafts, an intermediate gear journaled in said axle and intermeshing with said last-mentioned gears on said shafts, a steering-post, and a flexible driving connection between said intermediate gear and said post.

2. The combination, in steering gear for vehicles, with the steering-post of a vehicle, of a hollow front axle provided with interior bearings and with an exterior sleeve adjacent to one of such bearings, stub-axles having vertical spindles journaled in said axle, independent shafts journaled in said bearings, actuating means between said shafts and said spindles, gears secured on the adjacent ends of said shafts, a horizontal spindle and sleeve connected and respectively journaled in said bearing to which said first-mentioned sleeve is adjacent and in the latter, an intermediate gear mounted on said horizontal spindle to rotate therewith, said intermediate gear intermeshing with said first-mentioned gears, a head arranged to slide in said spindle sleeve, means to connect said spindle sleeve and head rotatably together, a shaft loosely connected with said head, a shaft adjacent to said steering-post, a universal coupling connection between said last-mentioned shafts, and engaging driving members on said post and said shaft which is adjacent thereto.

3. The combination, in steering gear for vehicles, with the steering-post of a vehicle, of a hollow front axle having slotted ends and provided with interior bearings, horizontal stub-axles having vertical spindles journaled in said axle, said stub-axles extending through and operating in the slots in the ends of said front axle, independent shafts journaled in said bearings, engaging driving members on said shafts and spindles, gears secured on the adjacent terminals of said shafts, a rotary member journaled in said axle and carrying an intermediate gear which intermeshes with said first-mentioned gears, a shaft operated by said steering-post, and a shaft having flexible connections, with said shaft operated by said post and with said rotary member.

4. The combination, in steering gear for vehicles, with the steering-post of a vehicle, of a hollow front axle provided with interior bearings, stub-axles having spindles journaled in said axle, independent shafts journaled in said bearings, means to actuate said spindles from said shafts, means to rotate said shafts in opposite directions, and flexible driving means between said steering-post and said rotary driving means for said shafts.

SZCZEPAN KUZDZIAL.

Witnesses:
A. C. FAIRBANKS,
F. A. CUTTER.

Copies of this patent may be obtained for five cents each, by addressing the "Commissioner of Patents, Washington, D. C."